United States Patent
Bauer et al.

[11] Patent Number: 5,913,919
[45] Date of Patent: Jun. 22, 1999

[54] METHOD FOR COLLISION AVOIDANCE WITH THE ASSISTANCE OF A STEERING ANGLE FIELD FOR AN AUTONOMOUS MOBILE UNIT

[75] Inventors: Rudolf Bauer; Wendelin Feiten, both of Nuebiberg, Germany

[73] Assignee: Siemens Aktiengesellschaft, Munich, Germany

[21] Appl. No.: 08/976,268

[22] Filed: Nov. 21, 1997

Related U.S. Application Data

[63] Continuation of application No. 08/428,417, Apr. 25, 1995, abandoned.

[30] Foreign Application Priority Data

May 4, 1994 [DE] Germany .............. 44 15 736

[51] Int. Cl.[6] .......................................... G06F 165/00
[52] U.S. Cl. ........................ 701/301; 701/23; 318/587; 180/169
[58] Field of Search ............... 701/23, 300, 301; 318/587; 180/167, 168, 169; 395/80, 88, 90

[56] References Cited

U.S. PATENT DOCUMENTS

| | | | |
|---|---|---|---|
| 4,809,178 | 2/1989 | Ninomiya et al. | 364/461 |
| 4,862,373 | 8/1989 | Meng | 364/461 |
| 5,056,031 | 10/1991 | Nakano et al. | 395/90 |
| 5,367,457 | 11/1994 | Ishida | 364/424.02 |
| 5,377,106 | 12/1994 | Drunk et al. | 364/424.02 |
| 5,545,960 | 8/1996 | Ishikawa | 364/424.02 |
| 5,570,285 | 10/1996 | Asaka et al. | 364/461 |

OTHER PUBLICATIONS

R. Bauer et al., "Steer Angle Fields: An Approach to Robust Manoeuvring in Cluttered, Unknown Environments", Robotics and Autonomous Systems 12 (1994), pp. 209–212.
J. Borenstein et al., "Histogramic In–Motion Mapping for Mobile Robot Obstacle Avoidance", IEEE Transactions on Robotics and Automation, vol. 7, No. 4, Aug. 1991, pp. 535–539.
R. Bauer et al., "Steer Angle Fields: An Approach to Robust Manoeuvring in Cluttered, Unknown Environments", Proceedings of the International Workshop on Intelligent robotic Systems, Jul. 1993, pp. 67–70.

*Primary Examiner*—Gary Chin
*Attorney, Agent, or Firm*—Hill & Simpson

[57] ABSTRACT

An improved method for the orientation of autonomous mobile units is provided. Collision distances to obstacles are thereby calculated on the basis of the steering and drive geometry of the movable unit. On the basis of these distances, allowed steering angle ranges for the unit are defined. Additionally, a defined observation horizon is prescribed for the sensor equipment of the unit. The obstacles to be evaluated are within this horizon. Moreover, a safety zone is defined around the unit in which no obstacles can be located; otherwise, travel in reverse is triggered. For route optimization of the unit, steering angle ranges that derive from different observation horizons and safety zones are combined on a case-by-case basis. By reducing the safety margin only in narrow passages down to the housing contour of the unit in the extreme case, the maximum steering angle can be utilized. As a result thereof, a greatest possible degree of maneuverability is also assured between obstacles residing close to one another.

14 Claims, 3 Drawing Sheets

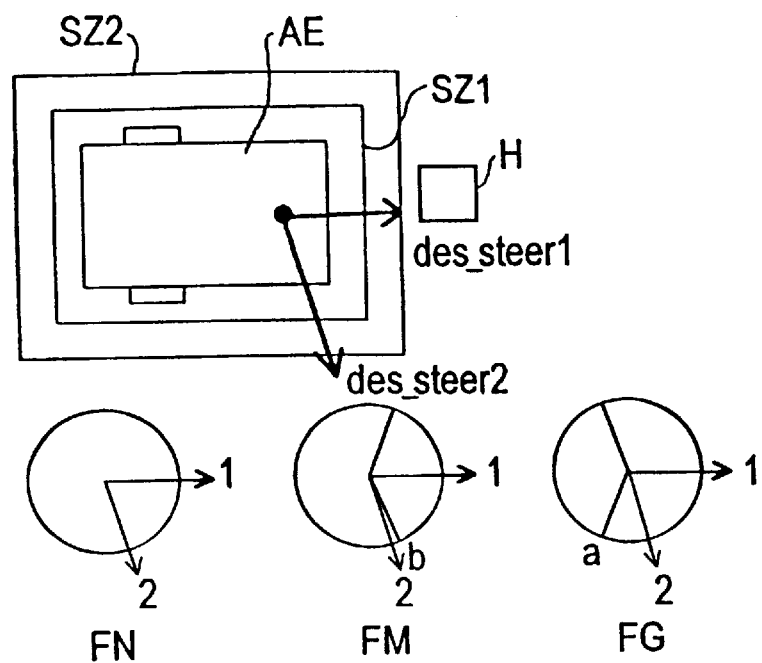
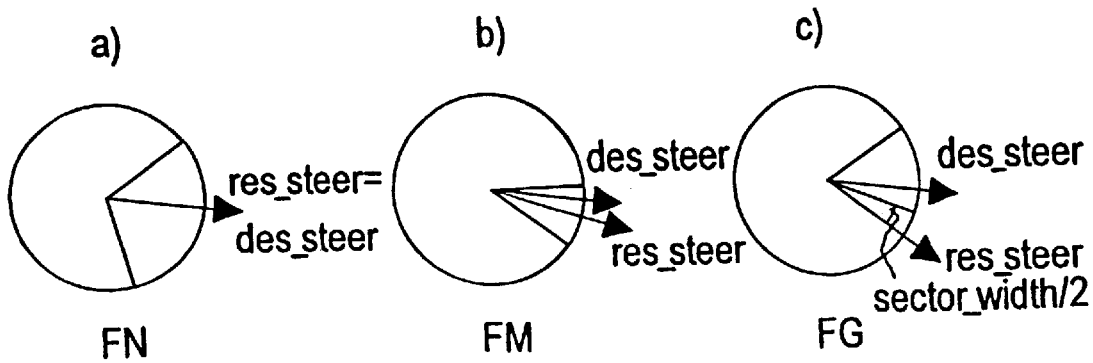

METHOD FOR COLLISION AVOIDANCE WITH THE ASSISTANCE OF A STEERING ANGLE FIELD FOR AN AUTONOMOUS MOBILE UNIT

This is a continuation, of application Ser. No. 08/428,417 filed Apr. 25, 1995, now abandoned.

BACKGROUND OF THE INVENTION

1. Field of the Invention

The present invention relates generally to mobile units, i.e. autonomous robots and more specifically to a method for collision avoidance with the assistance of a steering angle field for an autonomous mobile unit.

2. Description of the Related Art

Sensor-assisted motion of autonomous mobile units in complex, unknown environments fraught with obstacles such as, for example, offices or dwellings, makes a considerable demand of the control and of the data interpretation of the mobile unit.

Such a unit, for instance a robot, is only capable of carrying out useful tasks when it can move goal-oriented in its environment and can also avoid obstacles over a period of several hours.

Since the area of movement of the unit is usually unknown and also changes dynamically, it is meaningful to locally identify most of the details that affect the immediate movement of the unit. Consistent therewith, a distinction is made between the planning, which supplies a sequence of intermediate target points, and local maneuvering, which moves the autonomous unit from one intermediate target to the next intermediate target. Fast mechanisms that allow obstacles to be reliably avoided and that nonetheless assure great mobility of the unit are required for this task. The unit should be able to move without advance information in unprepared surroundings and should be able to do this with reasonable speed (approximately 50 cm per second). The typical distances between obstacles can thus be on the order of magnitude of the dimensions of the mobile unit or smaller. The passages that it must traverse when travelling can thereby also be extremely tight obstacles (for example, persons) can move with a speed that is comparable to that of the unit. Thus, the self-propelled unit must work most of the time at the limits of its sensor equipment or of its geometrical and kinematic restrictions. An additional complicating factor when ultrasound sensors are utilized is that these have the disadvantage of a near-range blind zone.

The following fundamental works in the field of orientation of autonomously operating mobile units are known: R. Bauer, W. Feiten, G. Lawitzky, Steer Angle Fields:

An Approach to Robust Maneuvering in Cluttered, Unknown Environments, Proc. Int. Workshop on Intelligent Robotic Systems, pp.67–70, July 1993. J. Borenstein, Y. Koren, "Histogrammic In-Motion Mapping for Mobile Robot Obstacle Avoidance", IEEE Trans. on Robotics and Automation, Vol.7, No.4, August 1991.

Despite the comprehensive work in the field of self-propelled mobile units, there are still difficulties in the interpretation of sensor information and in assuring a fast reaction to dynamically changing environments. Another problem is the taking of these changes into consideration in conjunction with a local orientation of autonomous mobile units.

SUMMARY OF THE INVENTION

An object underlying the present invention is to provide an improved method of collision avoidance with the assistance of a steering angle field for an autonomous mobile unit.

This and other objects are inventively achieved in the method of the present invention for collision avoidance for an autonomous mobile unit. The method has the steps of identifying at least a shortest travel path of the mobile unit from its location to a potential collision point with at least one obstacle located within a defined, variable observation area between the mobile unit and a boundary line surrounding the mobile unit, termed a collision distance, by using at least drive and steering geometry and outside dimensions of the mobile unit; identifying a steering angle to be respectively set at the mobile unit using the collision distance, the drive and steering geometry and the outside dimensions of the mobile unit, the steering angle being identified so as to just avoid leading to a collision with the at least one obstacle when the mobile unit travels thereby to derive a permitted steering angle range with reference to the location of the mobile unit therefrom.

One advantage of the inventive method is a reduction of the calculating outlay in the control unit of an autonomous mobile unit can be reduced. The method applies a permanently defined observation area as a basis for route planning. As a result, only those obstacles that are situated within this observation area must be interpreted.

A further advantage of the inventive method is that a plurality of observation areas are defined dependent on motion requirements. Also, allowable ranges of steering angle are determined separately for these observation areas, even for a plurality of obstacles. Obstacles at different distances from the autonomously operating unit can thus be separately interpreted. Also, the obstacles can be taken into consideration better in global motion planning for the purpose of a start-target motion of the mobile unit.

It is especially beneficial given the presence of a plurality of obstacles in the environment, in the observation area of the autonomous mobile unit, to separately identify and store the ranges of steering angle for the obstacles, to also form intersection of these allowed ranges of steering angle and to store this in a range of steering angle field that specifies the allowed steering angle for a current position as the basis of a route planning. The planning for a route is facilitated by this procedure and the calculating time required therefor in the control unit of the mobile unit is shortened.

In order to avoid collision with static obstacles, the method of the invention beneficially provides that a safety zone is defined around the unit, no obstacle being allowed to penetrate therethrough. A high degree of maneuverability is guaranteed by the method of the invention, even given the appearance of obstacles in the near region of the unit. A reliable maneuverability of the self-propelled mobile unit even at high speeds is beneficially assured by the method of the invention in that the observation area is correspondingly adapted dependent on the travel speed.

It is beneficial to select a small observation area for low travel speeds and a large observation area for comparatively high travel speeds. The situation will usually be such that the unit moves past tight places at a low speed and moves past unrestricted places at a high speed. It is thus assured on the basis of the inventive method that the distance between starting point and target point can be traversed quickly.

Advantageously, a range of steering angles is formed with the inventive method as the union of two allowed ranges of steering angle that are valid for different observation areas. A long-term planning of the route is thus facilitated as warranted and an optimum speed of the unit on its route is assured.

In order to facilitate a global route planning and to be able to travel with adapted speed, the method of the invention advantageously provides that at least two safety zones be defined for an observation area and that the appertaining range of steering angle fields be separately calculated for these safety zones. Dependent on travel situation, a switch can thus be made to the respectively valid range of steering angle field.

In addition, a cyclical implementation of the method leads thereto that changes in the environment can be reacted to quickly.

Also, the inventive method advantageously provides that non-static obstacles be reacted to be travelling in reverse.

Advantageously, the inventive method also assures maneuverability of the mobile unit through tight squeezes when no permissible range of steering angle occurs, the safety zone around the unit be reduced in size in order to have greater latitude in the calculation of the permissible steering angle. In the extreme case, the safety zone is thereby selected so small that it coincides with the housing dimensions of the mobile unit.

The inventive method can be advantageously applied when cellularly structured environment maps are used as local maps. Operations related to obstacles such as, for example, the calculation of steering angle fields can be mathematically reduced to matrix operations. Thus, the calculating procedure in the control computer can be accelerated, and a shorter reaction time can thus be achieved.

The method of the present invention shall be set forth further below with reference to the figures.

BRIEF DESCRIPTION OF THE DRAWINGS

FIG. 5 illustrates the calculation of a steering angle in the method of the present invention.

FIG. 6 shows various examples in the calculation of a steering angle for the mobile unit in the method of the present invention.

DETAILED DESCRIPTION OF THE PREFERRED EMBODIMENTS

Figure 1:
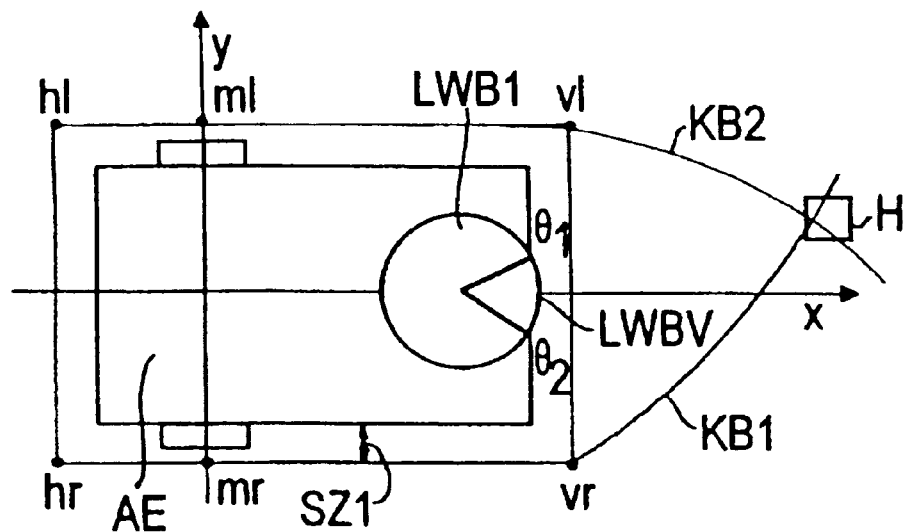
FIG. 1 shows an autonomous mobile unit for use in the method of the present invention with an obstacle.

FIG. 1 shows an autonomous mobile unit AE and obstacle H. A safety zone SZ1 is placed around the autonomous mobile unit AE, which shall be referred to as the unit AE below. In the calculation of the distance of the unit AE from obstacles, this safety zone SZ1 serves as a contour of the unit AE. To this end, outside extreme points vr, vl, ml, hl, hr and mr of the unit AE are provided at the safety zone SZ1. With the assistance of the kinematics of the unit AE, a controller can now determine an angle at which the unit AE describes a circular arc which does not lead to a collision with the obstacle H when the unit AE is travelling in a forward direction.

The determinant circular arc KB1 that the unit AE describes, given travel forward toward the left and that just carries the unit AE past the obstacle H, is shown for the angle $\theta_1$. The determining calculation point for the collision analysis is thereby the point vr on the safety zone SZ1 of the unit AE.

For forward travel toward the right, the determining angle is $\theta_2$ at which the unit describes the circular arc KB2 that carries it past the obstacle H when travelling forward right. The meaning of travelling past the obstacle here is that the extreme point v1 located on the safety zone SZ1 just passes by the center of the obstacle H without colliding with the obstacle H.

Two angles $\theta_1$ and $\theta_2$ that describe a forbidden steering angle range LWBV can be derived from the analysis of the forward motion. This forbidden steering angle range LWBV thus covers all steering angles at which the autonomous mobile unit AE would collide with the obstacle H. Subtraction of this steering angle range LWBV from 360° leads to a permitted steering angle range LWB1. This permitted steering angle range LWB1 covers all steering angles at which the unit AE can travel forward or in reverse and at which it does not collide with the obstacle H in the environment. As a simplification, only one obstacle H is shown here. This analysis, however, can also be implemented simultaneously for a plurality of obstacles without a limitation of the inventive method. Dependent on the location of the autonomous mobile unit AE, a permitted steering angle range in relationship to an obstacle in the environment is obtained with this motion analysis for the momentary location. Here, for example, let the origin of the xy coordinates be selected as the location.

Figure 2:
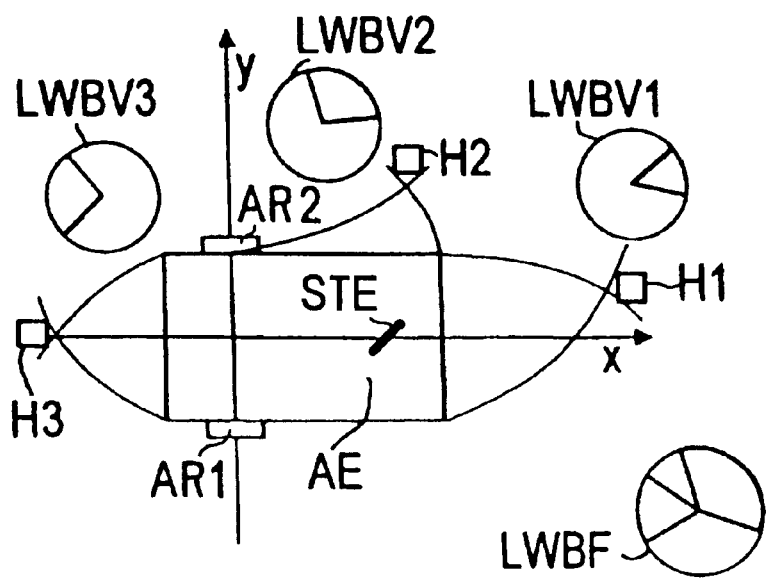
FIG. 2 shows an autonomous mobile unit for use in the method of the present invention with a plurality of obstacles.

FIG. 2 shows the collision analysis of the autonomous mobile unit AE for a plurality of obstacles H1–H3. Dependent on the kinematics of the unit AE and its location, which is located here at the origin of the xy coordinates, different permitted and forbidden steering angle ranges derive with reference to the individual obstacles.

The motion analysis is implemented in the way set forth in FIG. 1. A forbidden steering angle range LWBV1 is obtained for the obstacle H1. A forbidden steering angle range LWBV2 is obtained for the obstacle H2, and a forbidden steering angle range LWBV3 is obtained for the obstacle H3. It is inconsequential as basis of a farther reaching route planning, whether the forbidden steering angle ranges or the permitted steering angle ranges are further-processed for analysis purposes.

The steering angle range field LWBF is obtained by the formation of the union of the individual, calculated steering angle ranges LWBV1–LWBV3. As previously shown, the forbidden steering angles therein are shown shaded and the permitted steering angles are shown white.

In order to facilitate the route planning of the autonomous mobile unit AE, only specific obstacles can be taken into consideration dependent on selected observation areas and safety zones. Different steering angle range fields LWBL can be stored dependent on the respective location of the unit AE. The storing in fields allows the individual data that are stored per obstacle to be accessed simply on the basis of mathematical operations. For example, degree of occupancy values can thus be simultaneously raised or lowered for a plurality of obstacles.

Figure 3:
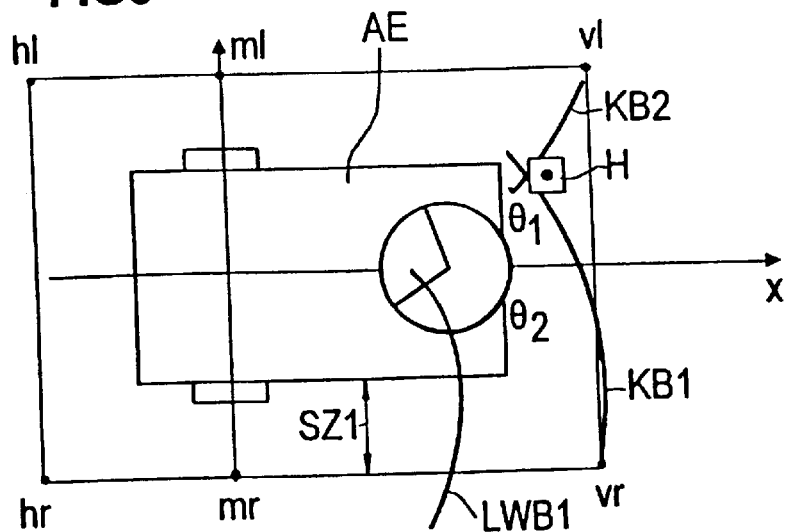
FIG. 3 shows an autonomous mobile unit for use in the method of the present invention with an obstacle in the safety zone.

FIG. 3 shows the determination of a steering angle range for an obstacle H that is situated within the safety zone SZ1 of the autonomous mobile unit AE. The observations previously provided mainly consider a static environment. FIG. 3 illustrates a part of the inventive method that is concerned with dynamically changing environments.

As was set forth above, obstacles that are situated outside the safety zone are reliably avoided by the inventive method in that a collision distance is calculated in advance and corresponding steering angle ranges are defined for every obstacle. Since, however, obstacles can also move in the environment, for example, persons or pieces of equipment can also be shifted, it can occur that the autonomous mobile unit AE notices an obstacle inside its safety zone. When this is the case, a control routine of the unit AE can, for example, provide that the unit AE is immediately stopped. A steering angle range field LWB1 is now recalculated. As shown in FIG. 3, this automatically leads thereto that the forbidden steering angle range is very large and the allowed steering angle range LWB1 is very small. The circular arcs KB1 and KB2 again derive for the angles $\theta_1$ and $\theta_2$. The allowed steering angles can now be observed by the unit AE only by travelling in reverse. A control program of the autonomous mobile unit AE can therefore provide that a stop is made in front of an obstacle and that travelling in reverse is initiated. The reverse travel can then occur, for example, in the framework of global motion planning, within an allowed steering angle range LWB1. After the obstacle H has left the safety zone SZ1, a switch can be made back to forward travel within the framework of a global route planning and a steering angle that leads on the shortest path to the destination can be set.

Figure 4:
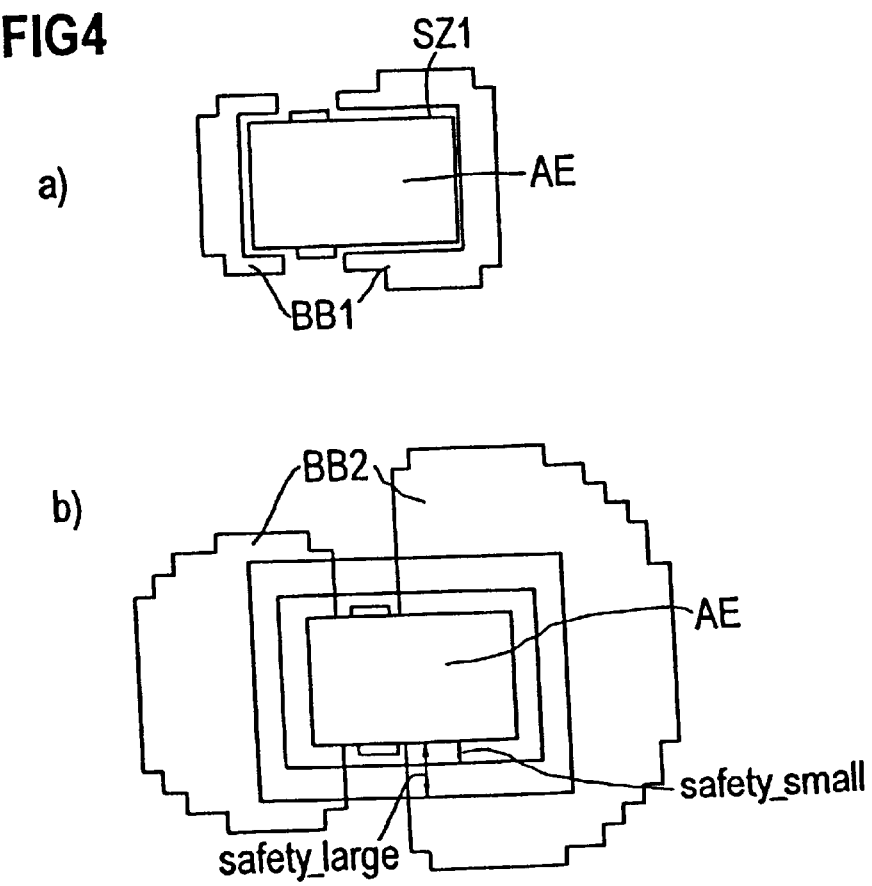
FIG. 4 shows an autonomous mobile unit for use in the method of the present invention with different observation areas.

FIG. 4 shows an autonomous mobile unit AE with various observation areas BB1 and BB2. Safety zones of different sizes, safety_small and safety_large, may also be seen in FIG. 4b.

FIG. 4a shows the autonomous mobile unit AE, having safety zone SZ1 and observation area BB1. The use of a relatively small observation area is advantageous, given slow speeds, i.e. small relative to the dimensions of the autonomous mobile unit AE, and when the unit AE is in tight squeezes. A narrow safety zone SZ1 is also advantageously selected therefor, so that no maneuverability is wasted in the route planning and collision analysis due to the consideration of a safety margin. By selecting a small observation horizon BB1, only a few obstacles in the near range of the mobile unit need be evaluated. For example, a control computer that implements the motion planning in the control unit of the autonomous mobile unit AE is thus relieved. For example, the evaluation speed for obstacles in the near range of the environment can therefore also be enhanced. Thus, an evaluation of, for example, sensor data can occur at a higher speed since only a few obstacles need be taken into consideration. It is also conceivable that more obstacles appear in a tight passage, and these lead to difficulties in the calculation of the permissible steering angles. Such a situation increases the necessary calculating outlay.

FIG. 4b shows an autonomous mobile unit having an observation area BB2 that is larger than the observation area BB1 shown in FIG. 4a and has two safety zones, safety_small and safety large.

For example, in this situation it is to be assured that the autonomous mobile unit AE does not collide with obstacles even given fast forward or reverse travel of the unit AE. Dependent on the travelling speed of the unit AE, a larger observation zone BB2 can be selected. A farther reaching route planning thus becomes possible for a control computer. This procedure is also present when few obstacles are present in the environment, so that, for example, the number of obstacles to be evaluated can always be kept constant on the basis of a suitable selection of an evaluation area BB2. A uniform usage of the computer, for example, can thus be achieved or, respectively, an overload can be prevented. Safety zones of different sizes, safety small and safety large, can thus be selected for the compensation of the mass inertia given fast forward travel of the autonomous unit AE. Dependent on the travel speed, for example, safety small is selected at low speed and safety_large is selected at high speed. It is also conceivable, however, that to calculate the steering angle range fields simultaneously for the large and for the small safety zones. Differences in steering angle range that derive from the observation area BB2 and from the safety zones of different sizes can be evaluated for the route planning. For example, a braking event of the autonomous mobile unit can be initiated when an obstacle enters the safety zone, safety_large.

FIG. 5 shows how an allowed steering angle can be found from a combination of different safety zones SZ1 and SZ2 with different observation horizons. Only three combinations FN, FM and FG shall be considered here by way of example. Other combinations of safety margins and observation areas are conceivable. With limiting the method of the invention, various combinations of safety zones and observation areas are possible in order to implement a route planning for the autonomous unit AE globally as well as locally. Three combinations with which experimental investigations were carried out and that proved beneficial are recited here by way of example.

FN indicates a near field in which the safety zone is selected very small, for example, on the order of 1 cm, and the observation area is about 15 cm. As a rule, FN should be applied in the near range at low speed and when traversing narrow passages. A constant observation area having, for example, an expanse of 45 cm is provided given the combinations FM and FG. However, the collision analysis for FM was based on the smaller safety zone SZ1 and that for FG was based on the larger safety zone SZ2.

Since the obstacle H is situated directly in front of the unit AE, the first steering angle desteer1 determined in the framework of a global route planning cannot be adhered to. An evasive control angle desteer2 must therefore be found. As one can see, there is no permissible steering angle in FN. It can likewise be seen that no permissible steering angle can be found in FG that still allows the mobile unit to travel in a forward direction. Only in FM does the control angle desteer2 result as a permissible control angle since it is located in the white area, i.e. in the permitted steering angle range. This illustrates that an optimum steering angle can be found even in narrow passages or in front of obstacles by varying the size of the safety zone. A transition from SZ1 to SZ2 was provided in this case with a suitable selection of an observation area, for example 45 cm. Here, the optimum desired angle to achieve direct forward travel, as prescribed by dessteer1 is not possible; however, a steering angle can be found that still allows travel in the direction of the target of the autonomous unit AE. Such evasive maneuvers can definitely be combined with, for example, a wall tracking method within the framework of motion control and global route planning.

FIG. 6 shows a further example for identifying a steering angle for an autonomous mobile unit. FIG. 6a shows that the desired control angle that was determined, for example, within the framework of a global route planning and the resultant control angle des-steer and res-steer coincide and these can be travelled.

FIG. 6b shows how, for example, a different resultant control angle res-steer other than the desired control angle des-steer is selected, even though both are to be encountered within an allowed steering angle range. As FIG. 6b shows, the permitted steering angle range is extremely small. This situation can occur when the self-propelled mobile unit moves within a narrow passage. In order to be able to offer optimum evasion possibilities for continued travel, the resultant steering angle res-steer is set in the middle of the permitted steering angle range. This results therein that the autonomous unit AE can move exactly in the middle between two identified obstacles or in the middle of a narrow passage.

FIG. 6c shows a further example for calculating a valid steering angle. Here, too, the desired steering angle des-steer is indicated and the resultant steering angle res-steer is shown. Since the desired steering angle is located within a forbidden steering angle range, a steering angle must be found that is located within the permissible steering angle range. To this end, the inventive method provides that, for example, the desired control angle be varied by a fixed, experimentally defined step size in order to find a resultant control angle that is located within the allowed steering angle range. In order to define an evasion direction, the variation is first tried, for example, to the left and then to the right. It is thus found whether a resultant steering angle that is located within the allowed steering angle range can be found by a selected angle variation sector_width 2.

In FIG. 6c, the variation of the desired control angle with the sector_width toward the right leads width result that can be pursued. It is also conceivable that the variation step width is increased or decreased in size dependent on the size of the forbidden steering angle zone. The strategies illustrated in FIGS. 6a–6c were experimentally confirmed by a good route planning.

The inventive method can be most advantageously utilized above all given the use of cellularly structured environment maps for the orientation of the autonomous mobile unit AE. The steering angle ranges for the individual obstacles can be especially simply stored in a field that can be globally accessed during the motion of the mobile unit AE.

Translations or the reduction of degree of occupancy values as well can thus be implemented in common for all obstacles.

In general, for example, one can proceed in the following way. FIG. 5 and FIG. 6 are referenced in the following description. Preferably, an attempt is always made first to find a suitable steering angle in the area FG so that the unit maintains the larger safety margin from the obstacles. The speed of the unit can also be selected relatively high. When the desired steering angle (des-steer) is forbidden, then a search is made in the area FG toward the left and right proceeding from des-steer up to a maximum search width (search width =90°) to see whether a steering angle is permitted. The next permitted steering angle is then embarked upon. Given des-steer2 in FIG. 5, for example, a steering angle a is travelled. When no permitted steering angle is found in the area FG within search-width, then a search is made in the area FM with the same algorithm to find a suitable control angle. Given dessteer1, for example, no steering angle is found in the area FG. A steering angle b is then found in the area FM.

When a steering angle from the area FM is taken for travel, then the speed is also reduced since the safety margin is smaller. When a steering angle is found neither in the area FG nor in the area FM, then the unit AE, for example, pivots back and forth on the spot. As a result thereof, grid cells erroneously occupied in a cellularly structured map should be erased.

When the desired steering angle des—steer can be embarked upon, then, for example, an additional check is made to see whether a few other steering angles can still be embarked upon to the left and right. When the steering angles can be travelled in every direction up to at least sector_width/2, then res-steer is selected identical to des-steer, as in FIG. 6a.

When an adequate plurality of steering angles are no longer allowed to the left and right, then, for example, res-steer is selected such that it is located in the middle of an allowed steering angle range, as in FIG. 6b. The result of this measure is that the unit AE travels exactly in the middle in a narrow passage.

When the desired steering angle is located in a forbidden range, then a search for a permitted steering angle is made in both directions. When a permitted steering angle has then been found, then, for example, the middle of an allowed sector is again sought. When the set of found, permitted steering angles is larger than sector width, then, for example, that steering angle that, as in FIG. 6c, that is sector_width/2 distanced from the first permitted steering angle is selected.

The effect thereof is that the unit AE when avoiding obstacles, evades somewhat more greatly when adequate space is present than is absolutely necessary. This behavior is meaningful since the unit AE then leaves more space to the obstacle and need not brake as greatly.

The steering angle range fields can be used very well for speed control. A simple speed control is possible when a velocity factor is allocated to every steering angle range field according to the equation:

$$v\_ref = speed\_factor * v\_ref\_max$$

where v_ref is the velocity at which the virtual drive wheel (follow up wheel) should travel. The v_ref_max is a predetermined, maximum speed. When a steering angle from the area FG is then taken, the corresponding speed factor for this field is also set. For example, the speed factor for this field is 1.0, i.e. maximum speed, since the largest safety zone is used therefor. The speed factors of the areas FM and FN are to be selected appropriately lower.

Although other modifications and changes may be suggested by those skilled in the art, it is the intention of the inventors to embody within the patent warranted hereon all changes and modifications as reasonably and properly come within the scope of their contribution to the art.

We claim:

1. Method for collision avoidance for an autonomous mobile unit, comprising the steps of:

measuring obstacles in an environment of the mobile unit;

identifying a collision distance by determining at least a shortest travel path of the mobile unit from its location to a potential collision point with at least one obstacle located within a defined, variable observation area between said mobile unit and a boundary line surrounding said mobile unit,;

identifying a steering angle to be respectively set at said mobile unit using the collision distance and a safety zone around said mobile unit, said steering angle being identified so as to just avoid leading to a collision with said at least one obstacle when said mobile unit travels thereby to derive a permitted steering angle range with reference to said location of said mobile unit therefrom;

reversing travel direction of said mobile unit after locating said at least one obstacle in said safety zone; and using said permitted steering angle range to control said mobile unit to avoid collision.

2. Method according to claim 1, further comprising the step of:

defining at least two observation areas, a first observation area comparatively small relative to the dimensions of said mobile unit and a second observation area comparable to said dimensions of said mobile unit, wherein at least one permitted steering angle range is respectively defined.

3. Method according to claim 2, further comprising the steps of:

determining at least one permitted steering angle range per obstacle and depositing said steering angle in a steering angle range field; and forming said permitted steering angle range from said mobile unit as a union of a plurality of permitted steering angle ranges of said steering angle range field.

4. Method according to claim 1, further comprising the steps of:

determining at least one permitted steering angle range per obstacle and depositing said steering angle in a steering angle range field; and forming said permitted steering angle range for said mobile unit as a union of a plurality of permitted steering angle ranges of said steering angle range field.

5. Method according to claim 1, further comprising the step of:

varying said steering angle by a pre-determined amount to achieve a resulting steering angle that is located within said permitted steering angle range.

6. Method according to claim 5, wherein said varying step is further defined by varying said steering angle in a first direction, and when not successful, varying said steering angle in a second, opposite direction.

7. Method according to claim 5, wherein said pre-determined amount is equal to one-half a sector width of said permitted steering angle range.

8. Method according to claim 1, further comprising the step of:

defining said variable observation area dependent on a travel speed at which the mobile unit travels.

9. Method according to claim 8, wherein the step of defining said variable observation area is further defined by defining at least a first observation area for comparatively low travel speed and defining at least a second observation area for comparatively high travel speed.

10. Method according to claim 1, wherein said safety zone is smaller than said variable observation area, wherein only obstacles that lie outside said safety zone are considered.

11. Method according to claim 10, further comprising the steps of:

defining at least two said safety zones for at least one said variable observation area; and determining respectively appertaining steering angle range field.

12. Method according to claim 1, wherein said method is implemented cyclically by repeatedly identifying at least the shortest travel path and by identifying the steering angle.

13. Method according to claim 1, wherein said step of defining a safety zone around said mobile unit is further defined by decreasing the size of said safety zone when no permitted steering angle can be derived.

14. Method according to claim 1, further comprising the step of:

orienting said mobile unit on the basis of a cellularly structured environment map wherein an obstacle is indicated in said map by a degree of occupancy.

* * * * *